United States Patent
Betzner et al.

[19]

[11] Patent Number: 6,068,804
[45] Date of Patent: May 30, 2000

[54] PROCESS FOR MAKING EXPANSION JOINT MATERIAL

[75] Inventors: William E. Betzner; Fred L. Migliorini, both of Pinellas County, Fla.

[73] Assignee: Celotex Corporation, Tampa, Fla.

[21] Appl. No.: 09/305,793

[22] Filed: Jul. 2, 1998

Related U.S. Application Data

[63] Continuation of application No. 08/821,548, Mar. 21, 1997, abandoned, which is a continuation-in-part of application No. 08/594,104, Jan. 30, 1996, abandoned, which is a continuation-in-part of application No. 08/233,287, Apr. 25, 1994, abandoned.

[51] Int. Cl.[7] .................................................. B29C 67/02
[52] U.S. Cl. ........................ 264/86; 264/122; 264/126; 264/175; 264/DIG. 32; 162/147; 162/148; 162/170; 162/171
[58] Field of Search ............................... 264/86, 87, 101, 264/109, 122, 125, 126, 175, DIG. 32; 162/147, 148, 161, 168.1, 170, 171

[56] References Cited

U.S. PATENT DOCUMENTS

| | | |
|---|---|---|
| 2,563,115 | 8/1951 | Huggins . |
| 3,271,240 | 9/1966 | Kari et al. . |
| 3,406,127 | 10/1968 | Alexander . |
| 3,790,401 | 2/1974 | Maine . |
| 3,892,586 | 7/1975 | Vladar et al. . |
| 4,052,492 | 10/1977 | Kontny et al. . |
| 4,139,507 | 2/1979 | Sundie et al. . |
| 4,153,503 | 5/1979 | Booth et al. . |
| 4,263,093 | 4/1981 | Shenk . |
| 4,279,790 | 7/1981 | Nakajima . |
| 4,343,840 | 8/1982 | Edwards et al. . |
| 4,364,975 | 12/1982 | Cork et al. . |
| 4,437,896 | 3/1984 | Partanen . |
| 4,587,070 | 5/1986 | Niwa et al. .............................. 264/122 |
| 4,608,108 | 8/1986 | Goll . |
| 4,911,788 | 3/1990 | Pittman et al. . |
| 4,988,388 | 1/1991 | Schloman, Jr. . |
| 5,116,653 | 5/1992 | Frandina . |
| 5,277,762 | 1/1994 | Felegi, Jr. et al. . |

FOREIGN PATENT DOCUMENTS

| | | |
|---|---|---|
| 231311A | 12/1985 | Germany . |
| 84130396 | 7/1984 | Japan . |

OTHER PUBLICATIONS

New Riverside University Dictionary, p. 157, © 1984.

*Primary Examiner*—Jan H. Silbaugh
*Assistant Examiner*—Kenneth M. Jones
*Attorney, Agent, or Firm*—Charles W. Vanecek

[57] ABSTRACT

A process of producing an asphalt-impregnated fiberboard comprises the steps of forming an aqueous slurry of a fibrous material and asphalt, the solids content of the slurry being less than about 8 weight percent, mixing the slurry to uniformly distribute its components, dewatering the slurry to form a wet mat, pressing the wet mat to consolidate it, and drying the consolidated wet mat. Fiberboards made by the process can be employed as durable resilient expansion joints between various types of structural members.

24 Claims, 2 Drawing Sheets

PROCESS FOR MAKING EXPANSION JOINT MATERIAL

This is a continuation of application Ser. No. 08/821,548, filed Mar. 21, 1997, now abandoned, which is a continuation-in-part of application Ser. No. 08/594,104, filed Jan. 30, 1996, now abandoned, which is a continuation-in-part of application Ser. No. 08,233,287, filed Apr. 25, 1994 now abandoned.

BACKGROUND OF THE INVENTION

1. Field of the Invention

This invention relates to an improved process for the manufacture of an expansion joint material and to the resultant expansion joint material.

2. Description of the Prior Art

Expansion joint materials are used in connection with various structures, particularly concrete types such as bridges, roadways, sidewalks, airport runways and the like. Since these latter structures tend to expand and contract with temperature changes, the expansion joints commonly are interposed at certain fixed intervals in the structures. Such expansion joints necessarily must be resilient and concomitantly must be enduring and not readily affected by moisture or be subject to deterioration when exposed to the elements. For practical purposes, the joint also should be capable of being efficiently handled and put in place without an undue amount of skilled labor. The joint further should be producible at a reasonable cost.

Heretofore, highly satisfactory expansion joints having the above characteristics have been formed from boards composed of fibers securely bonded together and uniformly saturated with asphalt to insure longevity. These fiber expansion joints are typically produced by cutting an asphalt saturated fiberboard into strips of a desired width and length. The fiberboards are first formed and then saturated in a subsequent operation by dipping into a solution of asphalt and a solvent, whereby a satisfactory penetration of the fiberboard by the asphalt is accomplished.

Unfortunately, there are a number of distinct disadvantages associated with the saturating and follow-up board drying procedures. These steps are time consuming, laborious, expensive, and potentially dangerous. The special trouble with the procedures stems from use of the solvent which, although it particularly furthers the asphalt's penetration into the fiberboard, is difficult to handle and has the potential to be hazardous. Without the proper precautions, the hazards from use of a solvent include the risk of fire, explosion, and pollution of the workplace environment and the atmosphere, together with the possibility of attendant health problems for the workers and others who come in contact with the solvent or its vapors. Furthermore, the loss of expensive solvent during the operation can add significantly to the cost of production. Measures to curb such solvent loss also can increase the operation's expense.

There accordingly is a need for an efficient and relatively inexpensive method which requires the use of little or no solvent for making expansion joints having all the characteristics desired in such materials.

OBJECTS OF THE INVENTION

It is an object of the present invention to provide an improved method which wholly avoids the use of a solvent or substantially reduces such use in the production of a high quality expansion joint material.

It is a further object of the present invention to provide new and improved expansion joints for use as durable resilient connections between various types of structural members.

It is another object of the present invention to provide an asphalt-impregnated fiberboard by an improved method which requires little or no solvent.

Other objects and advantages of the present invention will become apparent to those skilled in the art when the instant disclosure is read in conjunction with the accompanying drawings in which like numerals indicate like elements.

SUMMARY OF THE INVENTION

The above objects have been achieved by the method of the present invention, wherein a bituminous-impregnated fiberboard is produced from an aqueous dispersion of the board-forming ingredients. The board is suitably made by mixing the ingredients together in water to make an aqueous slurry having a solids consistency, by weight, of about 0.5 to 8%. The method advantageously involves the formation of a wet board-forming mat as a felted structure at a suitable density, such as in the range of about 18 to 25 lbs/ft$^3$, so that upon drying it becomes a structural board suitable as an expansion joint. The felting can be from a fluid suspension of fibers on any of the usual types of fiberboard felting machines, such as the Fourdrinier, Oliver Filter, an ordinary cylinder machine, etc.

The fiberboard is preferably made of cellulosic fibers, such as wood pulp, bagasse, straw or other suitable vegetable fibers, but other organic or inorganic fibers could also be used. Natural fibrous material is particularly suitable. Generally, the fibers are present in amounts of about 45% to 65%, by weight of the board. The fibers generally will have nominal lengths within the range of from about 0.25 to about 13 mm, and preferably from about 0.5 mm to about 7 mm. The board is comprised principally of the fibers, which give it strength and flexibility, and in a preferred embodiment are present in amounts of at least about 50 wt %, such as between about 50 and about 58 wt %. Wood fibers, such as northern hardwoods, and combinations of bagasse and waste paper fibers are especially useful.

While this invention follows the usual practice of incorporating a bituminous material in the expansion joint to provide resistance to water absorption and help bind together the composition, it departs therefrom by adding this waterproofing agent during and not after the manufacture of the fiberboard. Most or preferably all of the asphalt or other bituminous material, which is in a finely divided state, is added to the aqueous slurry containing the fibrous material prior to felting on a conventional machine for forming the water laid product The asphalt desirably has a softening point which is high enough to prevent its melting together before addition to the aqueous slurry. This melting can be caused by factors such as unduly high ambient and/or equipment temperatures. After board formation, a subsequent coating operation may be employed to treat the surface of the resulting fiberboard and enhance the overall acceptability, including appearance, of the product. This treatment can be accomplished, for example, with asphalt and/or solvent or a coating containing an organic or inorganic coloring agent, such as dyes, pigments, etc.

The invention may be carried out with any asphalt conventionally used in the production of expansion joints. The asphalt can be added as particles or in a molten state which is reduced to particles when mixed in the aqueous medium. The asphalt in a solid or liquid state may be delivered directly to the aqueous medium without atomization or other conversion from one physical state to the other immediately before incorporation in the aqueous medium, such as disclosed in U.S. Pat. No. 4,052,492. The reduction to an appropriate particle size may be suitably accomplished by a refiner. Furthermore, the asphalt or the greater part thereof is not added in the form of an emulsion. The tendency of emulsified asphalt to adhere to the forming machine surfaces can severely hinder the process. Accordingly, only a minor proportion of the asphalt, e.g. up to about 15 weight % of the board, may be advantageously added in an emulsified condition to supplement the non-emulsified majority of the material.

The invention desirably includes asphalts which are reducible in particle size to about 20 to 100 mesh or even finer for employment in the aqueous slurry. A mesh size ranging from about 30–100 has proved highly advantageous. Generally, the inventive process benefits from a high proportion of small asphalt particles, e.g., particles which pass through a 40 mesh screen. The asphalt content of the finished product advantageously is in the range from about 20 to 45, more preferably 35 to 45, wt %, and must be at least 35.0 wt % to meet the requirement of ASTM D 1751-83 (Reapproved 1991).

In a preferred embodiment of this invention, a synthetic or natural rubber is added to the aqueous slurry to be felted. The rubbery material contributes to the resiliency of the product Advantageously, at least enough rubbery material is included to ensure that the finished expansion joint will meet the requirement of ASTM D 1751-83 (Reapproved 1991)for a minimum of 70% recovery of its original thickness after compression. The rubber typically constitutes from about 5 to 10 wt % of the product Typically, the rubber is in the form of particles having a mesh size ranging from about 5 to 80. A particularly desirable rubbery material for use in the invention is reclaimed rubber scrap.

BRIEF DESCRIPTION OF THE DRAWINGS

FIG. 3 is a diagrammatic, side elevational view of an apparatus for surface treatment of the water-laid board of this invention.

DETAILED DESCRIPTION OF THE INVENTION

According to this invention there is provided, via an aqueous slurry system, a bituminous-impregnated fiberboard for use as an expansion joint filler in a wide variety of constructions. The fiberboard of the invention is made by a wet process in which the solid constituents are mixed in an aqueous slurry which is then dewatered and molded by various methods such as by cylinder or Fourdrinier machines, suction molds, or the like, dried, and cut to size. The slurry includes the fibrous and bituminous materials and the composition may include the presence of a natural or synthetic rubber for improved compression characteristics. Furthermore, other agents conventionally used in the processing of fibrous expansion joints, such as wetting agents, softening agents, binders, biocides, other waterproofing agents, etc., can be used for improving various characteristics of the joints.

Figure 1:
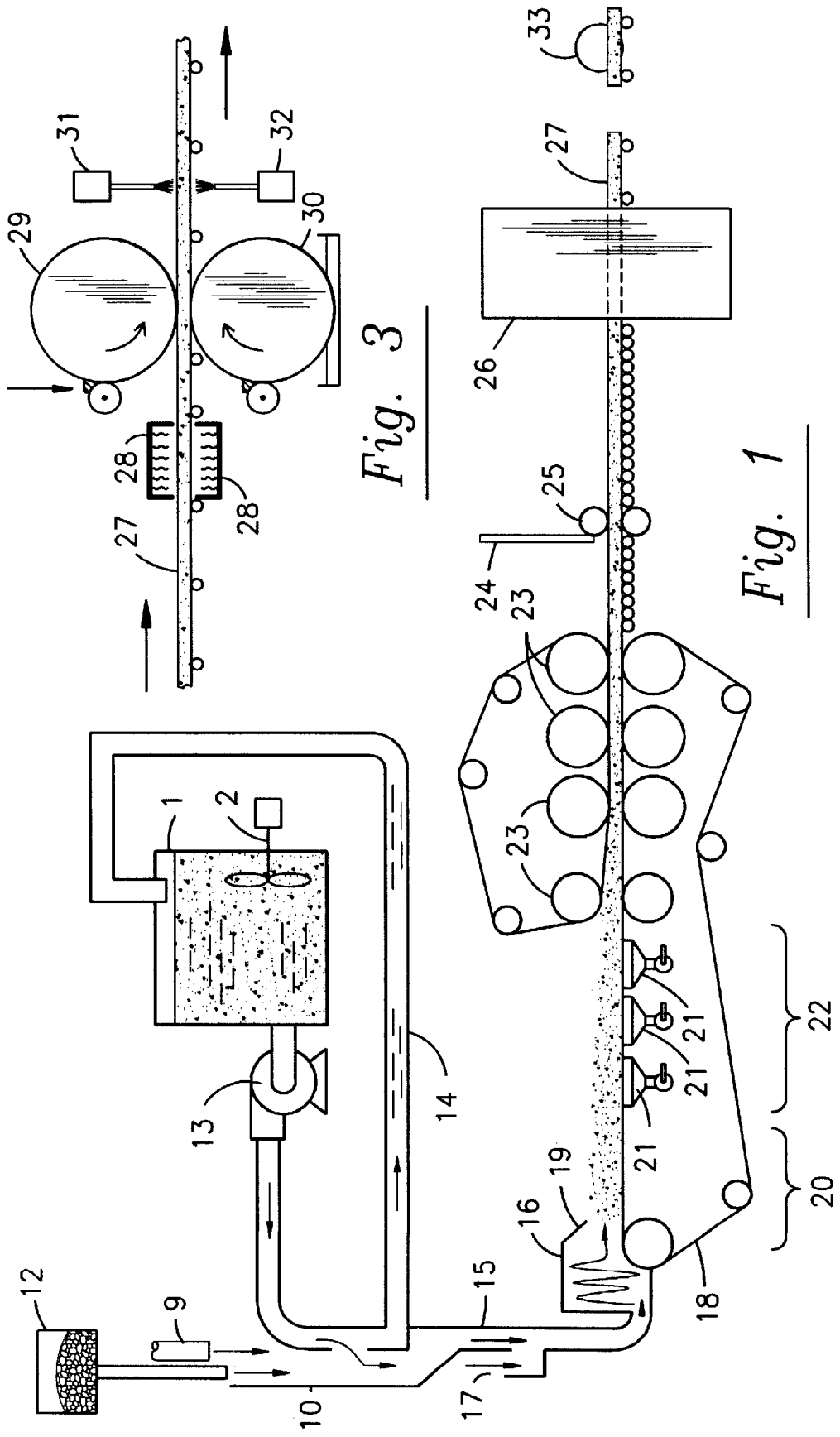
FIG. 1 is a diagrammatic, side elevational view of an apparatus for carrying out the wet-laid process of the present invention.

In a typical preparation of a slurry in accordance with the invention, as in FIG. 1, the board-making fibers in an amount of about 40 to 65 % by weight, on a water-free basis, are added to a machine chest 1 containing water. The concentration of solids in the slurry is advantageously kept low to ensure that the materials flow properly and do not clog the dewatering equipment of the board-forming process. The free draining solids are readily processable in a high speed continuous water-felting Fourdrinier operation. The total solids content of the slurry in chest 1 is typically less than about 8 wt %, generally less than about 4 wt %, based on the total weight of the slurry. The machine chest agitator 2 is suitably operated to keep the slurry stirred up so that the fibrous ingredients are uniformly distributed throughout the slurry.

Cellulosic fibers desirably are employed as the fibrous component of the expansion joint. The fibers are derivable from trees and plants of all kinds. Ordinary raw materials such as vegetable fibers (cane fiber, ligneous fiber, bast fiber, and cotton staple), used paper pulp, and chemical pulp may be used. The fiber length will generally be up to about 1 inch.

Typical fibers for use in the present invention are bagasse, wood fibers and wastepaper fibers. The wastepaper may be, for example, newspaper, corrugated board paper, cardboard paper, scraps thereof, and paper "sludge". Wastepaper is suitably used together with bagasse, which will be the primary fibrous component of the combination. The mixture generally consists of 1 part by weight wastepaper to 3–5 parts by weight bagasse.

Among suitable bituminous materials for addition to the fiber-containing slurry of the invention, asphalts characterized by penetration values in the range from 0 to about 30 at 77° F. (ASTM D 5–52) and by softening points in the range from about 210 to about 300° F. (ASTM D 36, Ring and Ball Method), may be used. Preferably, the asphalts will have a softening point from about 215 to about 290° F. and a penetration from 0 to about 2 at 77° F. (ASTM D 5).

One suitable bituminous material is employed in the form of pellets having the following preferred characteristics:

| | |
|---|---|
| Pellet Size: | ⅛" minimum diameter, to ⅜" maximum diameter with less than 5% smaller, and none larger. |
| Specific Gravity at 60° F. | 1.0–1.2 |
| Flash Point (ASTM D 92), C.O.C., ° F. | 600 minimum |
| Softening Point (ASTM D 36), ° F. | 215–225 |
| Penetration (ASTM D 5) | |
| @ 77° F., 100 grams, 5 sec. | 2 maximum |
| @ 115° F., 50 grams, 50 sec. | 5–10 |

Figure 2:
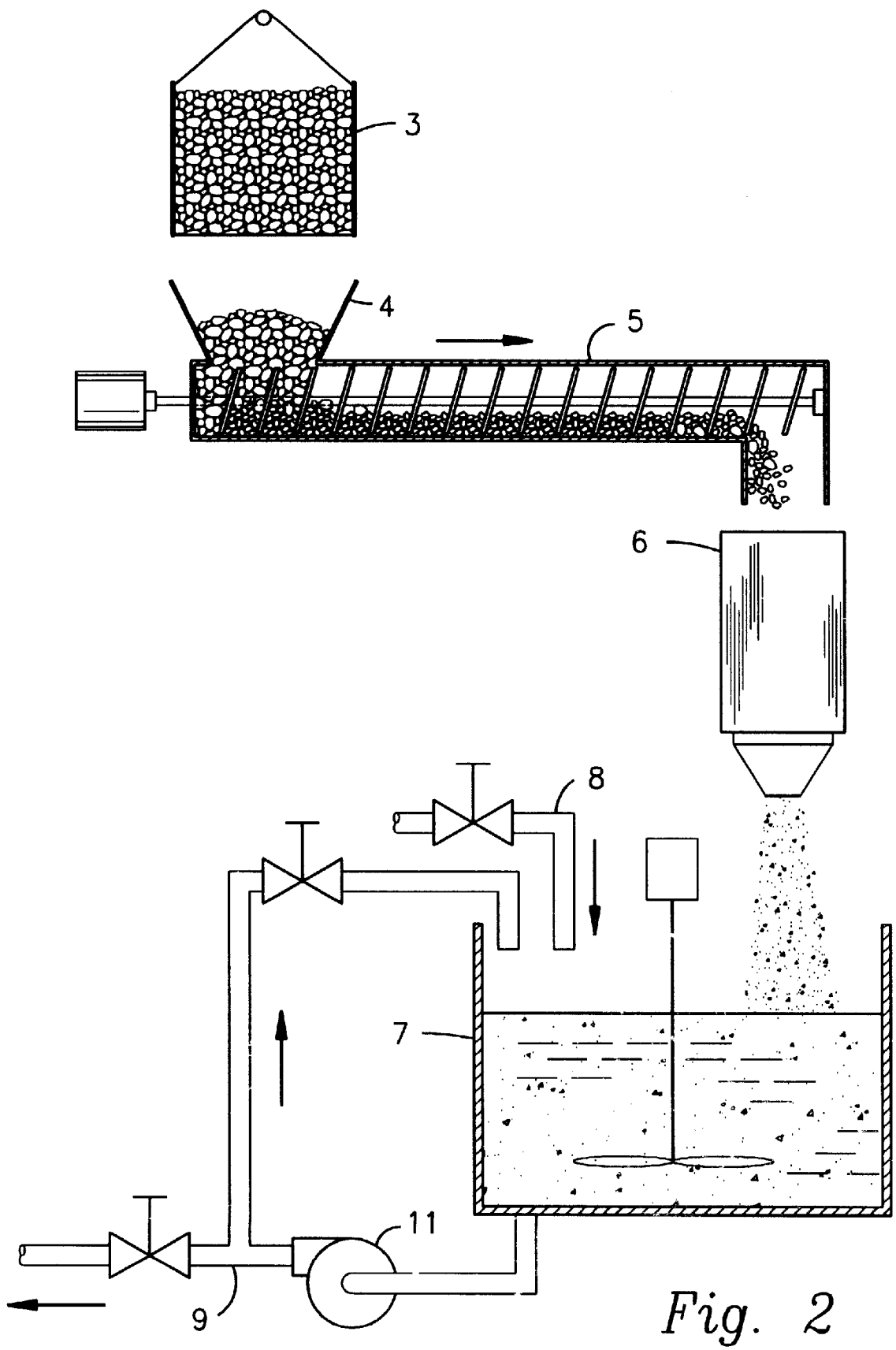
FIG. 2 is a diagrammatic, side elevational view of an apparatus for adding pulverized asphalt pellets to the process of this invention.

The bituminous component is appropriately reduced in size for incorporation in the fiber-containing slurry, and may be included in an amount of about 30 to 50% by weight of the solids. The size reduction and addition of the asphalt may be accomplished as shown in FIG. 2. Asphalt pellets (~½" mesh) having a softening point of about 220° F. are transferred from containers 3 to a live-bottom feed hopper 4, which feeds into a conveyor 5 for delivery of a suitable flow of asphalt pellets in the process. Various types and sizes of conveyors may be selected to achieve the right flow. For example, a suitable feed rate of 185 lbs/minute of asphalt pellets can be provided by a screw conveyor 5 having a diameter of 10 inches and tuning at about 45 rpm. An adequate and well-controlled flow is also achievable by a belt conveyor which advantageously functions without the heat-inducing and potentially asphalt agglomerating equipment of a screw conveyor.

The feed from conveyor 5 discharges directly into a centrifugal impact mill 6 or other suitable grinding device, which pulverizes the asphalt pellets into appropriately sized particles for the board-forming process. A satisfactory pulverization whereby 90% of the particles can pass through a 40 mesh screen is brought about by an Entoleter mill 6. The pulverized asphalt particles from mill 6 fall directly into a suitable mixing device 7, wherein they are dispersed in water supplied from pipe 8. Sufficient water is supplied to mixer 7 to ensure adequate mixing therein. A wetting agent (e.g., Dispex N-40 supplied by Allied Colloids, Inc.) may be added to homogenize the slurry in mixer 7. Emulsified asphalt may be added to the slurry to constitute a minor portion, preferably about 8 to 12 wt.%, of the total dried board. The resulting slurry is pumped through pipe 9 to a static mixing device 10 shown in FIG. 1. The slurry flow from mixer 7 to device 10, which suitably is about 200 gpm, is controlled by pump 11. The solids content of the slurry is about 0.5 to 3% by weight.

In a preferred embodiment of the present invention, any conventional synthetic or natural rubber is added to the board-forming slurry. The rubber is conveniently added in the form of particles whose mesh size suitably ranges from about 10 to 80, preferably 10 to 50. Advantageously, the rubber is in the form of granules derived by recycling rubber waste, including scrap tires. In the process of converting the scrap tires to rubber granules, impurities, such as metal particles and fibers, are beneficially removed. The granular particles of rubber obtained from recycling the rubber waste are called "crumb rubber". A useful crumb rubber product is supplied by Rouse Rubber Industries, Inc. under the trade designation G-278. The rubber particles 12, which are conveniently shipped in bags, are supplied to device 7 by feeder 14 (FIG. 2).

The slurry additionally may contain other auxiliary substances useful in conventional fiberboard-forming compositions, such as preservatives, wetting agents, defoamers, binders, fillers, retention aids, sizing agents, such as waxes, rosins, and silicones, biocides, and broke. The amounts of such auxiliary additives can be readily determined by those skilled in the art. These additives may be added to the slurry at various locations during the board-forming process, such as to machine chest 1 or at any other point where they will become sufficiently intermixed with the other board-forming components.

A typical formulation (dry weight basis) for formation of a water-laid board of the present invention is as follows:

| Ingredient | Typical (%) | Range (%) | Preferred Range (%) |
| --- | --- | --- | --- |
| Fiber | 58 | 30–90 | 50–80 |
| Asphalt | 35 | 20–50 | 35–45 |
| Rubber | 7 | 0–10 | 5–10 |
| Starch | 0 | 0–10 | 0–10 |
| Biocide | <1 | <1 | <1 |

Pump 13 functions to deliver the fiber-containing slurry to static mixing device 10. After addition of the asphalt and optional crumb rubber to the slurry in device 10, the slurried composition flows through pipe 15 to head box 16. A biocide is advantageously added to the slurry at static mixing device 10. Suitable distribution of the board-forming ingredients occurs during their passage to and through head box 16, whose internal structural arrangement (not shown) contributes to intermixing. The solids content in the head box is appropriately about 0.5 to 3 weight percent The slurry is subsequently deposited on Fourdrinier wire 18 through orifice 19 of head box 16. The first section 20 of the Fourdrinier wire permits free drainage of water from the material and further drainage is promoted by suction boxes 21 in section 22. As the slurry is brought in contact with the Fourdrinier machine and water of the slurry drains through the wire screen, a wet felted mat of the fibrous composition forms on the machine. A roll or tamper (not shown) may be used over the free draining section to create an even liquid surface. The wet laid mat is dewatered by the drainage section of the Fourdrinier machine to a solids content of about 5 to 15 weight percent.

The partially dried material is then prepressed to a thickness of about ½ inch by a plurality of press rolls 23. It will be appreciated that a single set of press rolls could be employed if desired. After being pressed, the sheet product will generally have from about 50 to about 70% water. A coating (e.g., a mixture of clay and carbon black) may be applied to the pressed mat by means of feed-pipe 24 and coater 25.

After passing through press rolls 23, the wet mat is transferred into dryer 26. Prior to entering dryer 26, the wet mat is cut into the desired lengths to be placed in the multi-deck dryer. The wet mat is suitably dried at about 400 to 600° F. for about ¾ to 1½ hours. The dried board 27 usually contains 0–5% by weight water. The dried board 27 is advantageously continuously producible at a line speed at least equal to about 40 lineal ft/min (480 ft$^2$/min for typical 12 ft wide boards), preferably at least 50 lineal ft/min (600 ft$^2$/min for 12 ft wide boards). After drying, the board surface may be sprayed with water to guard against any risk of fire.

In accordance with the process of the invention most or all of the asphalt is added to the core board during its manufacture. If desired, the resultant "wet-end" product may be decorated to give it a uniform, dark colored appearance by a surface treatment. An example of such treatment is the addition of solvent and/or asphalt to both major surfaces of the product. The application of a solvent to the surface of the asphalt-containing fiberboard is found to dissolve and evenly redistribute the asphalt over the board surface, producing an attractive surface appearance characterized by an even, dark color.

In the embodiment of the invention shown in FIG. 3, the surface treatment is accomplished by feeding the asphalt-containing fiberboard 27 onto a conveyor which conducts it to a coating station. Fiberboard 27 is fed in the direction of the arrow directly from the board machine dryer 26. Infrared heaters 28 may be used to raise the temperature of the board surface and thereby promote fast penetration of the solvent and/or asphalt into the board. A controlled amount of the coating is applied to the surfaces of the board by passing it between top and bottom roll coaters 29 and 30, which may be heated. Heating of the board surfaces during this treatment aids in penetration. Devices 31, 32 may be positioned after the coating apparatus to spray water on the board surfaces for prevention of blocking if hot asphalt is used in the process. The coated board is stored for sufficient time to allow its ingredients to come to equilibrium and solvent utilized to evaporate from the board.

The asphalt-containing fiberboard produced by the apparatus of FIG. 1 typically is cut into smaller pieces for use, such as by saw arrangement 33. For utilization as expansion joints, the finished product is normally produced in sizes measuring ⅜–¾ inch thick, 3–8 inches wide and 5–12 feet long. Other typical characteristics of the wet-end expansion joint material of the invention are:

| Property | Wet-end Expansion Joint Material | ASTM D 1751 Requirements |
| --- | --- | --- |
| Thickness, in. | 0.500–0.520 | ½ ± ¹⁄₁₆ |
| Density, dry, lbs./ft³ | 20–22 | 19.0 min |
| Water absorption, 24 hrs., vol % | 15.0 max | 15.0 max |
| Asphalt, % | 35 min | 35 min |
| Compression Test (ASTM D 1751) | | |
| Load, lbs. | 300–600 | 100–750 |
| Recovery, % | 70 min | 70 min |
| Extrusion, in. | 0.02 | 0.250 |

In accordance with the present invention, the manufacture of asphalt-impregnated fiberboard can be accomplished simply without recourse to the involved measures characterizing past techniques, such as asphalt atomization or emulsification, and board hot-pressing. While such techniques are generally not required, asphalt atomization such as described in U.S. Pat. No. 4,052,492 and/or hot pressing of the fiberboard such as described in U.S. Pat. No. 4,587,070 are viable options in the production of boards modified with a synthetic or natural rubber.

Those skilled in the art to which the invention relates will appreciate that other substitutions and modifications can be made to the described embodiments, without departing from the spirit and scope of the invention as described by the claims below.

We claim:

1. A process of producing an asphalt-impregnated fiberboard comprising:
   (a) forming an aqueous slurry of (i) a fibrous material and (ii) asphalt, the solids content of the slurry being less than about 8 weight percent, the asphalt being included in the slurry in an amount of about 30 to 50% by weight solids, and optionally up to about 15% by weight solids being asphalt incorporated in the aqueous slurry in the form of an emulsion,
   (b) mixing the slurry to uniformly distribute components (i) and (ii) contained therein,
   (c) dewatering the slurry to form a wet mat of the components, the dewatering being accomplished by continuously dewatering the aqueous slurry on a moving porous carrier capable of passing drainable water therethrough and retaining solids thereon,
   (d) pressing the wet mat to consolidate it, and
   (e) drying the consolidated wet mat, with the proviso that the process includes no hot pressing of the dried consolidated mat formed by step (e).

2. The process of claim 1 wherein the solids content of the slurry of step (a) is about 0.5 to 3 weight percent.

3. The process of claim 1 wherein the wet mat is consolidated by one or more press rolls in pressing step (d).

4. The process of claim 1 wherein the wet mat is dried at about 400 to 600° F. for about ¾ to 1½ hours in drying step (e).

5. The process of claim 1 wherein the wet mat comprises, on a water-free basis, about 40 to 65 weight percent of component (i) and 30 to 50 weight percent of component (ii).

6. The process of claim 1 wherein up to about 15 weight % of the dried board is asphalt incorporated in the aqueous slurry in the form of an emulsion.

7. The process of claim 1 wherein the aqueous slurry of step (a) additionally contains a member selected from the group consisting of wetting agents, softening agents, binders, biocides, sizing agents, preservatives, defoamers, fillers, retention aids, broke and mixtures thereof.

8. The process of claim 1 wherein the surface of the fiberboard is sprayed with water after drying step (e).

9. The process of claim 1 wherein the aqueous slurry of step (a) additionally contains a sizing agent.

10. The process of claim 1 wherein the surface of the fiberboard is coated to improve the appearance of the fiberboard.

11. The process of claim 1 wherein component (i) of the aqueous slurry is a member selected from the group consisting of bagasse, wood fibers, wastepaper fibers and mixtures thereof.

12. The process of claim 1 wherein component (i) of the aqueous slurry is a member selected from the group consisting of wood fibers and a combination of bagasse and wastepaper fibers.

13. The process of claim 12 wherein component (i) of the aqueous slurry consists of the combination of bagasse and wastepaper fibers.

14. The process of claim 13 wherein the combination of fibers consists of 3 to 5 parts by weight of bagasse per 1 part by weight of wastepaper fibers.

15. The process of claim 1 wherein component (ii) of the aqueous slurry has a penetration value in the range from 0 to about 30 at 77° F. and a softening point in the range from about 210 to 300° F.

16. The process of claim 15 wherein component (ii) is in the form of pellets having a particle size of about 20 to 100 mesh.

17. The process of claim 1 wherein the aqueous slurry of step (a) additionally contains a natural or synthetic rubber.

18. The process of claim 17 wherein the rubber is crumb rubber, the crumb rubber being included in the slurry in an amount of about 5 to 10 % by weight solids.

19. The process of claim 18 wherein the crumb rubber is in the form of particles having a mesh size of about 10 to 80.

20. The process of claim 1 wherein 90% of the asphaltic solids of step (a) can pass through a 40 mesh screen.

21. The process of claim 1 wherein step (c) is accomplished by a conventional felting machine selected from the group consisting of a Fourdrinier, Oliver Filter and ordinary cylinder machine.

22. The process of claim 21 wherein step (c) is accomplished by a Fourdrinier machine having a first section which permits free drainage of water and a following section wherein drainage is promoted by suction boxes.

23. A process of producing an asphalt-impregnated fiberboard comprising about 30 to 50% by weight of asphalt and at least about 40% by weight by fibrous material which comprises:
   (a) adding the asphalt and fibrous material to water to form an aqueous slurry, the solids content of the slurry being less than about 8 weight percent, the asphalt being added in a solid or liquid state without conversion from either physical state to the other immediately before incorporation in the water, and optionally up to about 15% by weight solids being asphalt incorporated in the aqueous slurry in the form of an emulsion,
   (b) mixing the slurry to uniformly distribute the components contained therein, (c) dewatering the slurry to form a wet mat of the components, the dewatering being accomplished by continuously dewatering the aqueous slurry on a moving porous carrier capable of passing drainable water therethrough and retaining solids thereon, (d) pressing the wet mat to consolidate it, and (e) drying the consolidated wet mat, with the proviso that the process includes no hot pressing of the dried consolidated mat formed by step (e).

24. A process of producing an asphalt-impregnated fiberboard consisting essentially of:

(a) forming an aqueous slurry of (i) a fibrous material and (ii) asphalt, the solids content of the slurry being less than about 8 weight percent, the asphalt being included in the slurry in an amount of about 30 to 50% by weight solids, and optionally up to about 15% by weight solids being asphalt incorporated in the aqueous slurry in the form of an emulsion, (b) mixing the slurry to uniformly distribute components (i) and (ii) contained therein, (c) dewatering the slurry to form a wet mat of the components, (d) pressing the wet mat to consolidate it, and (e) drying the consolidated wet mat.

* * * * *